(12) United States Patent
Tachibana et al.

(10) Patent No.: US 11,372,155 B2
(45) Date of Patent: Jun. 28, 2022

(54) OPTICAL FIBER AND METHOD FOR MANUFACTURING OPTICAL FIBER

(71) Applicant: SUMITOMO ELECTRIC INDUSTRIES, LTD., Osaka (JP)

(72) Inventors: Kumiko Tachibana, Osaka (JP); Noriaki Iwaguchi, Osaka (JP); Takashi Fujii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 135 days.

(21) Appl. No.: 16/634,653

(22) PCT Filed: Apr. 17, 2018

(86) PCT No.: PCT/JP2018/015884
§ 371 (c)(1),
(2) Date: Jan. 28, 2020

(87) PCT Pub. No.: WO2019/026356
PCT Pub. Date: Feb. 7, 2019

(65) Prior Publication Data
US 2021/0088719 A1    Mar. 25, 2021

(30) Foreign Application Priority Data

Jul. 31, 2017    (JP) ............................. JP2017-147979

(51) Int. Cl.
*G02B 6/02* (2006.01)
*C03C 25/105* (2018.01)
*C03C 25/1065* (2018.01)
*C03C 25/326* (2018.01)
*C03C 25/50* (2006.01)

(52) U.S. Cl.
CPC ........ *G02B 6/02395* (2013.01); *C03C 25/105* (2013.01); *C03C 25/1065* (2013.01); *C03C 25/326* (2013.01); *C03C 25/50* (2013.01); *C03C 2217/78* (2013.01)

(58) Field of Classification Search
CPC .............. G02B 6/02395; C03C 25/105; C03C 25/1065; C03C 25/326; C03C 25/50; C03C 2217/78
See application file for complete search history.

(56) References Cited

U.S. PATENT DOCUMENTS

| | | |
|---|---|---|
| 5,181,269 A | 1/1993 | Petisce |
| 6,204,304 B1 | 3/2001 | Houlihan et al. |
| 7,532,795 B2 | 5/2009 | Takahashi et al. |
| 8,426,021 B2 | 4/2013 | Cattron et al. |

(Continued)

FOREIGN PATENT DOCUMENTS

| | | | |
|---|---|---|---|
| JP | 2003004993 A | * | 1/2003 |
| JP | 2003-095706 A | | 4/2003 |

(Continued)

*Primary Examiner* — Peter Radkowski
(74) *Attorney, Agent, or Firm* — Faegre Drinker Biddle & Reath LLP

(57) ABSTRACT

An optical fiber comprises a glass fiber; a primary resin layer coating an outer periphery of the glass fiber; and a secondary resin layer coating an outer periphery of the primary resin layer, and a pH of the primary resin layer is greater than a pH of the secondary resin layer.

20 Claims, 1 Drawing Sheet

(56) References Cited

U.S. PATENT DOCUMENTS

| | | | |
|---|---|---|---|
| 8,744,226 B2* | 6/2014 | Nakanishi | G02B 6/02395 |
| | | | 385/128 |
| 9,285,536 B2* | 3/2016 | Homma | G02B 6/02395 |
| 9,322,986 B2* | 4/2016 | Chien | G02B 6/02395 |
| 9,557,477 B2* | 1/2017 | Tachibana | C03C 25/1065 |
| 2011/0300367 A1* | 12/2011 | Chien | C09D 4/00 |
| | | | 428/221 |
| 2013/0064516 A1* | 3/2013 | Nakanishi | C03C 13/04 |
| | | | 385/128 |
| 2013/0343714 A1* | 12/2013 | Tachibana | C03C 25/326 |
| | | | 385/128 |
| 2014/0376866 A1* | 12/2014 | Sakabe | G02B 6/4432 |
| | | | 385/102 |
| 2014/0376867 A1* | 12/2014 | Chien | C09D 4/06 |
| | | | 385/123 |
| 2015/0192734 A1* | 7/2015 | Homma | G02B 6/02395 |
| | | | 385/102 |
| 2017/0248756 A1 | 8/2017 | Suyama et al. | |

FOREIGN PATENT DOCUMENTS

| | | | |
|---|---|---|---|
| JP | 2003095706 A | * | 4/2003 |
| JP | 2003-531799 A | | 10/2003 |
| JP | 2005-055779 A | | 3/2005 |
| JP | 2005055779 A | * | 3/2005 |
| JP | 2012-053121 A | | 3/2012 |
| WO | WO-01/083624 A2 | | 11/2001 |
| WO | WO-2013/051481 A1 | | 4/2013 |

\* cited by examiner

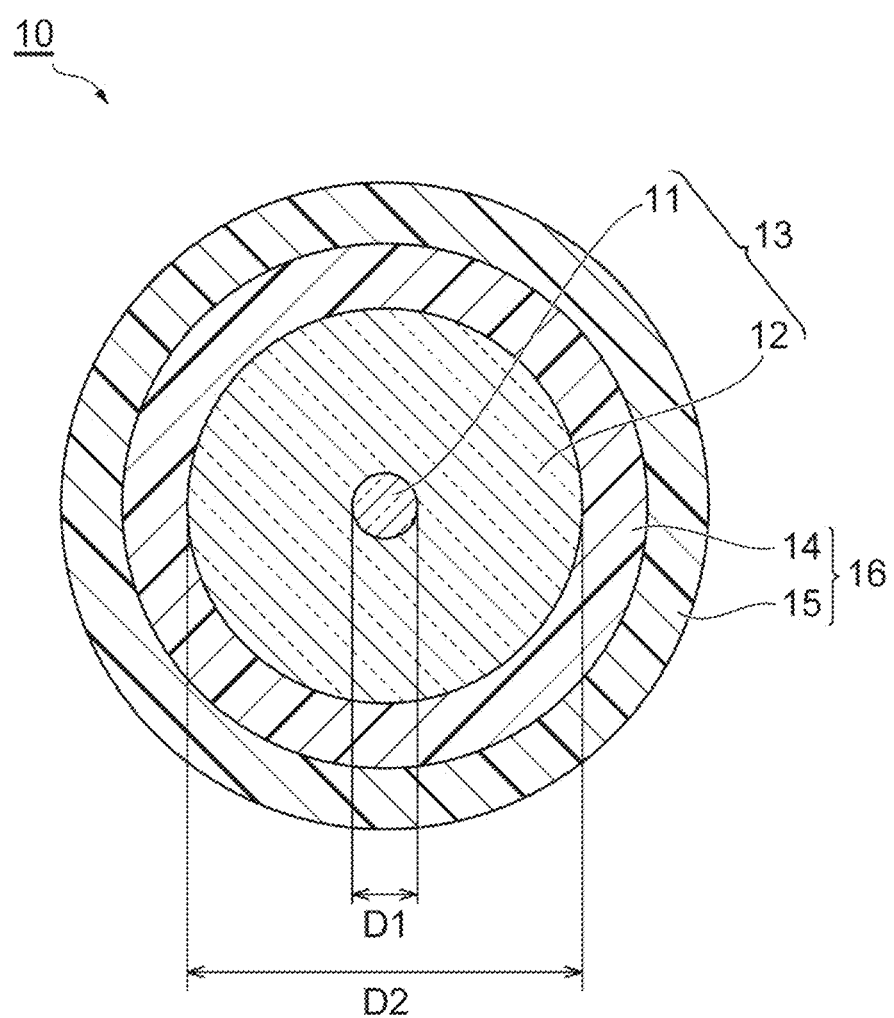

OPTICAL FIBER AND METHOD FOR MANUFACTURING OPTICAL FIBER

TECHNICAL FIELD

The present invention relates to an optical fiber and a method for manufacturing an optical fiber.

This application claims priority from Japanese Patent Application No. 2017-147979 filed on Jul. 31, 2017, the entire contents of which are incorporated herein.

BACKGROUND ART

An optical fiber generally has a coating resin layer for protecting a glass fiber that is an optical transmission medium. The coating resin layer is composed of, for example, two layers, a primary resin layer and a secondary resin layer. The primary resin layer is required to have excellent adhesiveness to the glass fiber. For example, a silane compound and a photo-acid generating agent for promoting the hydrolysis of the silane compound being contained in a resin composition forming a primary resin layer in order to improve adhesiveness is studied in Patent Literature 1.

CITATION LIST

Patent Literature

Patent Literature 1: JP 2003-531799 A

SUMMARY OF INVENTION

An optical fiber according to one aspect of the present invention comprises a glass fiber; a primary resin layer coating an outer periphery of the glass fiber; and a secondary resin layer coating an outer periphery of the primary resin layer, and a pH of the primary resin layer is greater than a pH of the secondary resin layer.

BRIEF DESCRIPTION OF DRAWINGS

FIG. 1 is a schematic cross-sectional view showing one example of the optical fiber of the present invention.

DESCRIPTION OF EMBODIMENTS

Problem to be Solved by the Present Disclosure

Reducing an increase in transmission loss induced by minute bending that occurs when lateral pressure is applied at low temperature, that is, improving the low temperature characteristics of an optical fiber, is required for the optical fiber. However, when a non-crosslinked component such as a photo-acid generating agent is included in a primary resin layer having a low Young's modulus, the transmission loss of the optical fiber at low temperature may increase.

Accordingly, it is an object of the present disclosure to provide an optical fiber also excellent in low temperature characteristics while having a good dynamic fatigue coefficient, and a method for manufacturing an optical fiber.

Effect of the Present Disclosure

According to the present disclosure, it is possible to provide an optical fiber also excellent in low temperature characteristics while having a good dynamic fatigue coefficient, and a method for manufacturing an optical fiber.

Description of Embodiments of the Present Invention

First, the contents of embodiments of the present invention will be listed and described. An optical fiber according to one aspect of the present invention comprises a glass fiber; a primary resin layer coating the outer periphery of the glass fiber; and a secondary resin layer coating the outer periphery of the primary resin layer, and the pH of the primary resin layer is greater than the pH of the secondary resin layer.

By setting the pH of the primary resin layer greater than the pH of the secondary resin layer, an optical fiber also excellent in low temperature characteristics while having a good dynamic fatigue coefficient can be fabricated.

From the viewpoint of setting the dynamic fatigue coefficient of the optical fiber in a good range, the difference between the pH of the primary resin layer and the pH of the secondary resin layer may be 1 to 3. From the same viewpoint, the pH of the above secondary resin layer may be 3 to 5.

From the viewpoint of increasing the dynamic fatigue coefficient of the optical fiber, the secondary resin layer may comprise a cured product of a resin composition containing a urethane oligomer, a monomer, a photopolymerization initiator, and an acidic substance.

The resin composition may contain 0.10 to 10% by mass of the acidic substance. Thus, the low temperature characteristics of the optical fiber can be further improved.

From the viewpoint of improving adhesiveness to the glass fiber, the primary resin layer may comprise a cured product of a resin composition containing a urethane oligomer, a monomer, a photopolymerization initiator, and a silane coupling agent.

The monomer included in the resin composition forming the primary resin layer may comprise a heterocycle-containing monomer. Thus, the rapid curability of the resin composition can be increased.

A method for manufacturing an optical fiber according to one aspect of the present invention is a method for manufacturing an optical fiber comprising a glass fiber, a primary resin layer coating the outer periphery of the glass fiber, and a secondary resin layer coating the outer periphery of the primary resin layer, comprising the step of curing a resin composition for a primary resin layer by irradiation with ultraviolet rays to form the primary resin layer; and the step of curing a resin composition for a secondary resin layer by irradiation with ultraviolet rays to form the secondary resin layer, wherein when the resin composition for the primary resin layer and the resin composition for the secondary resin layer are cured, the pH of the primary resin layer is greater than the pH of the secondary resin layer.

Details of Embodiments of the Present Invention

Specific examples of an optical fiber according to embodiments of the present invention will be described below with reference to the drawings. It is intended that the present invention is not limited to these illustrations, is shown by the claims, and includes all changes within the meaning and scope equivalent to the claims. In the following description, like numerals refer to like elements in the description of the drawings, and redundant description is omitted.

Optical Fiber

FIG. 1 is a schematic cross-sectional view showing one example of an optical fiber that is one mode of the present invention. An optical fiber 10 comprises a glass fiber 13 and a coating resin layer 16 provided on the outer periphery of the glass fiber 13. The coating resin layer 16 comprises a primary resin layer 14 provided in contact with the outer periphery of the glass fiber 13, and a secondary resin layer 15 coating the primary resin layer 14.

The glass fiber 13 consists of a core 11 and a cladding 12, and the cladding 12 surrounds the core 11. The core 11 and the cladding 12 mainly comprise glass such as quartz glass, and, for example, quartz to which germanium is added can be used for the core 11, and pure quartz or quartz to which fluorine is added can be used for the cladding 12.

In FIG. 1, for example, the outer diameter (D2) of the glass fiber 13 is about 125 µm, and the diameter (D1) of the core 11 constituting the glass fiber 13 is about 7 to 15 µm.

The thickness of the coating resin layer 16 is usually about 60 to 70 µm. The thickness of each of the primary resin layer 14 and the secondary resin layer 15 may be about 10 to 50 µm, and, for example, the thickness of the primary resin layer 14 may be 35 µm, and the thickness of the secondary resin layer 15 may be 25 µm. The outer diameter of the optical fiber 10 may be about 245 to 265 µm.

The primary resin layer 14 can be formed by curing a resin composition containing a urethane oligomer, a monomer, a photopolymerization initiator, and a silane coupling agent. In other words, the primary resin layer 14 can comprise a cured product of a resin composition containing a urethane oligomer, a monomer, a photopolymerization initiator, and a silane coupling agent.

The urethane oligomer can be prepared by reacting a polyol, a polyisocyanate, a hydroxyl group-containing (meth)acrylate, and a monohydric alcohol.

Here, a (meth)acrylate means an acrylate or the methacrylate corresponding to the acrylate. The same applies to a (meth)acryloyl.

Examples of the polyol include polytetramethylene glycol, polypropylene glycol, and bisphenol A-ethylene oxide-added diol.

Examples of the polyisocyanate include 2,4-tolylene diisocyanate, 2,6-tolylene diisocyanate, isophorone diisocyanate, and dicyclohexylmethane 4,4'-diisocyanate.

Examples of the hydroxyl group-containing (meth)acrylate include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol di(meth)acrylate.

Examples of the monohydric alcohol include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, capryl alcohol, lauryl alcohol, myristyl alcohol, cetyl alcohol, stearyl alcohol, and oleyl alcohol.

When the urethane oligomer is prepared, a catalyst, a polymerization inhibitor, and the like may be used. Examples of the catalyst include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. Examples of the polymerization inhibitor include methoquinone and hydroquinone.

The urethane oligomer can comprise the following reaction products (A) and (B):

$$\text{H-PI-(PO-PI)}n\text{-R} \quad \text{(A):}$$

$$\text{H-PI-(PO-PI)}n\text{-H} \quad \text{(B):}$$

wherein H represents the residue of a hydroxyl group-containing (meth)acrylate, PI represents the residue of a polyisocyanate, PO represents the residue of a polyol, and R represents the residue of an alcohol. For the alcohol, lower alcohols having up to 5 carbon atoms are preferred. n represents an integer of 1 or more, and is preferably 1 to 4.

The preparation of the urethane oligomer will be described by giving a specific example. For example, when polypropylene glycol, tolylene diisocyanate, 2-hydroxyethyl acrylate, and methanol are used as the polyol, the polyisocyanate, the hydroxyl group-containing (meth)acrylate, and the monohydric alcohol, respectively, the urethane oligomer can comprise the following reaction products (A1) and (B1):

$$\text{H1-TDI-(PPG-TDI)}n\text{-R1} \quad \text{(A1):}$$

$$\text{H1-TDI-(PPG-TDI)}n\text{-H1} \quad \text{(B1):}$$

wherein H1 represents the residue of 2-hydroxyethyl acrylate, TDI represents the residue of tolylene diisocyanate, PPG represents the residue of polypropylene glycol, and R1 represents the residue of methanol.

The reaction products (A) and (A1) are one-end non-reactive oligomers and therefore have the effect of decreasing the crosslinking density of the cured product and can reduce Young's modulus. The reaction products (B) and (B1) are both-ends reactive oligomers and therefore can increase the crosslinking density of the cured product.

The urethane oligomer according to this embodiment preferably contains a one-end non-reactive oligomer having a (meth)acryloyl group at one end and having an alkoxy group at the other end. The one-end non-reactive oligomer is the reaction product of a polyol, a polyisocyanate, a hydroxyl group-containing (meth)acrylate, and a monohydric alcohol.

From the viewpoint of decreasing the Young's modulus of the primary resin layer, the urethane oligomer preferably comprises 20% by mass or more, more preferably 40 to 100% by mass, of the one-end non-reactive oligomer based on the total amount of the urethane oligomer.

The urethane oligomer may further contain a both-ends reactive oligomer having (meth)acryloyl groups at both ends. The both-ends reactive oligomer is the reaction product of a polyol, a polyisocyanate, and a hydroxyl group-containing (meth)acrylate.

The content of the urethane oligomer in the resin composition is preferably 35 to 90% by mass, more preferably 50 to 85% by mass, and further preferably 60 to 80% by mass based on the total amount of the resin composition.

As the monomer, a monofunctional monomer having one polymerizable group, and a polyfunctional monomer having two or more polymerizable groups can be used. Two or more monomers may be mixed and used.

Examples of the monofunctional monomer include (meth)acrylate-based monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, phenoxyethyl (meth)acrylate, tetrahydrofurfuryl (meth)acrylate, benzyl (meth) acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxypolyethylene glycol (meth)acrylate, and isobornyl (meth)acrylate; carboxyl group-containing monomers such as (meth)acrylic acid, a (meth)acrylic acid dimer, carboxyethyl (meth)acrylate, carboxypentyl (meth)acrylate, and ω-carboxy-polycaprolactone (meth)acrylate; heterocycle-containing monomers such as N-acryloylmorpholine, N-vinylpyrrolidone, N-vinylcaprolactam, N-acryloylpiperidine, N-methacryloylpiperidine, N-acryloylpyrrolidine, and 3-(3-pyridinyl)propyl (meth)acrylate; maleimide-based monomers such as maleimide, N-cyclohexylmaleimide, and N-phenylmaleimide; N-substituted amide-based monomers such as (meth)acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-butyl(meth)acrylamide, N-methylol(meth)acrylamide, and N-methylolpropane(meth)acrylamide; and aminoalkyl (meth)acrylate-based monomers such as aminoethyl (meth) acrylate, aminopropyl (meth)acrylate, N,N-dimethylaminoethyl (meth)acrylate, and tert-butylaminoethyl (meth)acrylate. Among them, the monomer preferably comprises a heterocycle-containing monomer because of excellent rapid curability.

Examples of the polyfunctional monomer include bifunctional monomers such as ethylene glycol di(meth)acrylate, polyethylene glycol di(meth)acrylate, polypropylene glycol di(meth)acrylate, neopentyl glycol di(meth)acrylate, tripropylene glycol di(meth)acrylate, the di(meth)acrylate of a bisphenol A diglycidyl ether acrylic acid adduct, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth) acrylate, 1,12-dodecanediol di(meth)acrylate, 1,14-tetradecanediol di(meth)acrylate, 1,16-hexadecanediol di(meth) acrylate, 1,20-eicosanediol di(meth)acrylate, isopentyldiol di(meth)acrylate, 3-ethyl-1,8-octanediol di(meth)acrylate, and the ethylene oxide adduct di(meth)acrylate of bisphenol A; and tri- or higher functional monomers such as trimethylolpropane tri(meth)acrylate, trimethyloloctane tri(meth) acrylate, trimethylolpropane polyethoxy tri(meth)acrylate, trimethylolpropane polypropoxy tri(meth)acrylate, trimethylolpropane polyethoxy polypropoxy tri(meth)acrylate, tris [(meth)acryloyloxyethyl]isocyanurate, pentaerythritol tri (meth)acrylate, pentaerythritol polyethoxy tetra(meth) acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl]isocyanurate. Among them, the monomer preferably comprises a bifunctional monomer in order to improve the toughness of the primary resin layer.

The content of the monomer in the resin composition is preferably 5 to 45% by mass, more preferably 10 to 40% by mass, and further preferably 15 to 30% by mass based on the total amount of the resin composition.

The photopolymerization initiator can be appropriately selected from among known radical photopolymerization initiators and used, and examples of the photopolymerization initiator include acylphosphine oxide-based initiators and acetophenone-based initiators. Two or more photopolymerization initiators may be mixed and used.

Examples of the acetophenone-based initiators include 1-hydroxycyclohexyl phenyl ketone (manufactured by BASF SE, trade name "Irgacure 184"), 2-hydroxy-2-methyl-1-phenyl-propan-1-one (manufactured by BASF SE, trade name "Irgacure 1173"), 2,2-dimethoxy-1,2-diphenylethan-1-one (manufactured by BASF SE, trade name "Irgacure 651"), 2-methyl-1-(4-methylthiophenyl)-2-morpholinopropan-1-one (manufactured by BASF SE, trade name "Irgacure 907"), 2-benzyl-2-dimethylamino-1-(4-morpholinophenyl)-butanone-1 (manufactured by BASF SE, trade name "Irgacure 369"), 1-hydroxycyclohexyl phenyl ketone, 2,2-dimethoxy-2-phenylacetophenone, and 1-(4-isopropylphenyl)-2-hydroxy-2-methylpropan-1-one.

Examples of the acylphosphine oxide-based initiators include 2,4,6-trimethylbenzoyldiphenylphosphine oxide (manufactured by BASF SE, trade name "Irgacure TPO"), bis(2,4,6-trimethylbenzoyl)phenylphosphine oxide (manufactured by BASF SE, trade name "Irgacure 819"), bis(2,6-dimethoxybenzoyl)2,4,4-trimethylpentylphosphine oxide, and 2,4,6-trimethylbenzoyldiphenylphosphine oxide.

The content of the photopolymerization initiator in the resin composition is preferably 0.1 to 10% by mass, more preferably 0.3 to 7% by mass, and further preferably 0.5 to 5% by mass based on the total amount of the resin composition.

The resin composition forming the primary resin layer contains a silane coupling agent, and thus the adhesive force between the glass fiber and the primary resin layer is easily adjusted. The silane coupling agent is not particularly limited as long as it does not hinder the curing of the resin composition. Two or more silane coupling agents may be mixed and used.

Examples of the silane coupling agent include tetramethyl silicate, tetraethyl silicate, mercaptopropyltrimethoxysilane, oligomer-added mercaptopropyltrimethoxysilane (a silane coupling agent in which the portion of the SH of mercaptopropyltrimethoxysilane and the NCO of a urethane oligomer are reacted, for example, a silane compound in which the R of the reaction product (A) is the residue of mercaptopropyltrimethoxysilane), vinyltrichlorosilane, vinyltriethoxysilane, vinyltris(β-methoxy-ethoxy)silane, β-(3,4-epoxycyclohexyl)-ethyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropylbenzothiazyl tetrasulfide.

As the silane coupling agent, a silane coupling agent represented by formula (1) or (2) may be used.

[Chemical Formula 1]

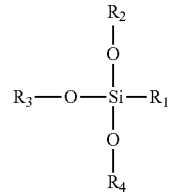

(1)

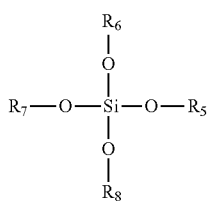

In formula (1), $R_1$ represents a group having reactivity to ultraviolet irradiation. Examples of the group having reactivity to ultraviolet irradiation include groups having functional groups such as a mercapto group, a mercaptoalkyl group, a vinyl group, an allyl group, and a (meth)acryloyl group.

In formulas (1) and (2), $R_2$ to $R_8$ each independently represent an alkyl group having 1 to 4 carbon atoms. Examples of $R_2$ to $R_8$ include methyl groups, ethyl groups, propyl groups, and butyl groups. $R_2$ to $R_4$ in formula (1) may each be the same or different, and $R_5$ to $R_8$ in formula (2) may each be the same or different.

Examples of the silane coupling agent represented by formula (1) include 3-mercaptopropyltrimethoxysilane, 3-mercaptopropyltriethoxysilane, 3-mercaptopropyltripropoxysilane, allyltrimethoxysilane, allyltriethoxysilane, allyltripropoxysilane, vinyltrimethoxysilane, vinyltriethoxysilane, vinyltripropoxysilane, 3-(meth)acryloxypropyltrimethoxysilane, and 3-(meth)acryloxypropyltriethoxysilane.

Examples of the silane coupling agent represented by formula (2) include tetramethoxysilane, tetraethoxysilane, and tetrapropoxysilane.

The content of the silane coupling agent in the resin composition is preferably 0.2 to 5% by mass, more preferably 0.3 to 3% by mass, and further preferably 0.5 to 2% by mass based on the total amount of the resin composition.

The Young's modulus of the primary resin layer 14 is preferably 0.03 to 0.5 MPa at 23° C. from the viewpoint of still further improving the low temperature characteristics of the optical fiber. The Young's modulus of the primary resin layer 14 can be measured by the Pullout Modulus test of the optical fiber 10 at 23° C. The Young's modulus of the primary resin layer 14 can be adjusted by the content of the one-end non-reactive oligomer, the curing conditions of the resin composition, and the like.

The secondary resin layer 15 can be formed, for example, by curing an ultraviolet curable resin composition comprising a urethane oligomer, a monomer, a photopolymerization initiator, and an acidic substance. In other words, the secondary resin layer 15 can comprise a cured product of a resin composition containing a urethane oligomer, a monomer, a photopolymerization initiator, and an acidic substance. The urethane oligomer, the monomer, and the photopolymerization initiator are not particularly limited and may be appropriately selected from those illustrated for the resin composition forming the primary resin layer.

The acidic substance is included in the secondary resin layer, and thus the dynamic fatigue coefficient of the optical fiber can be increased, and the low temperature characteristics of the optical fiber are easily improved. As the acidic substance according to this embodiment, a photo-acid generating agent, a compound having an acidic functional group, and the like can be used.

Examples of the photo-acid generating agent include diazonium salt-based acid generating agents, sulfonium salt-based acid generating agents, phosphonium salt-based acid generating agents, and iodonium salt-based acid generating agents.

The sulfonium salt-based acid generating agents are not particularly limited, and examples of the sulfonium salt-based acid generating agents include triarylsulfonium salts represented by the following formulas (S-1), (S-2), (S-3), and (S-4):

[Chemical Formula 2]

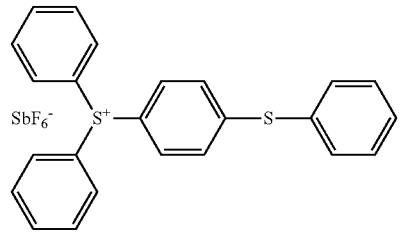

(S-1)

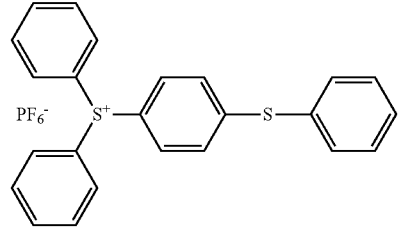

(S-2)

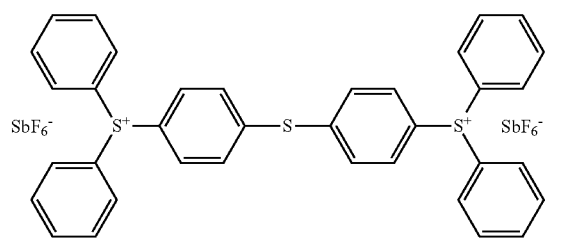

(S-3)

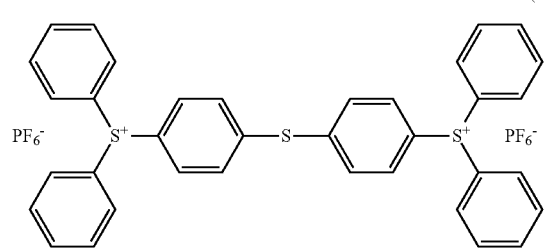

(S-4)

The iodonium salt-based acid generating agents are not particularly limited, and examples of the iodonium salt-based acid generating agents include diaryliodonium salts represented by the following formulas (I-1), (I-2), and (I-3):

[Chemical Formula 3]

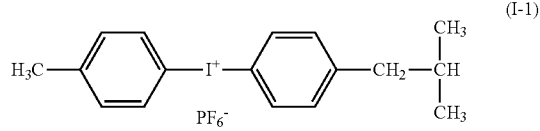

(I-1)

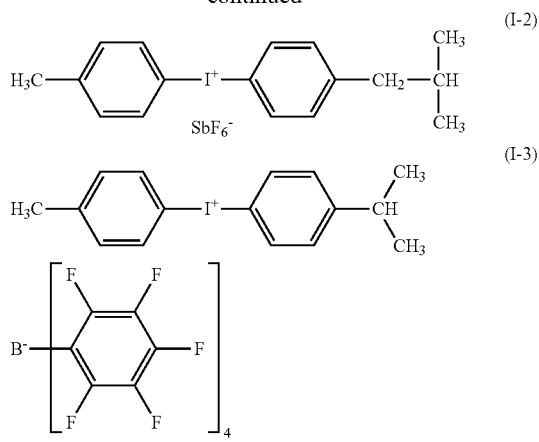

A compound having a carboxyl group, a sulfo group, or a mercapto group can be used as the compound having an acidic functional group. Specific examples of the compound having an acidic functional group include pentaerythritol tetrakis(3-mercaptopropionate).

The content of the acidic substance is preferably 0.10 to 10% by mass, more preferably 0.15 to 8% by mass, further preferably 0.20 to 6% by mass, and particularly preferably 0.25 to 5.5% by mass based on the total amount of the resin composition. When the content of the acidic substance is in the above range, the mechanical strength (tensile strength) is less likely to decrease.

From the viewpoint of increasing the dynamic fatigue coefficient, the pH of the secondary resin layer is preferably 3 to 5, more preferably 3 to 4.5. By setting the pH of the primary resin layer greater than the pH of the secondary resin layer, an optical fiber having a high dynamic fatigue coefficient can be fabricated. The difference between the pH of the primary resin layer and the pH of the secondary resin layer is preferably 1 to 3, more preferably 1.5 to 3. The pH of the primary resin layer may be 6 to 8.

The resin composition according to this embodiment may further comprise a leveling agent, an antifoaming agent, an antioxidant, a photosensitizer, and the like.

Method for Manufacturing Optical Fiber

As the method for forming the coating resin layer 16 on the glass fiber 13, methods conventionally used for the manufacture of optical fibers can be applied.

The optical fiber 10 in this embodiment can be manufactured by applying the resin composition to the outer periphery of the glass fiber 13 and then irradiating the applied resin composition with ultraviolet rays to cure the resin composition to form the coating resin layer 16.

At this time, a method (wet-on-dry method) may be used in which the resin composition for the primary resin layer is applied to the outer periphery of the glass fiber 13 and cured by irradiation with ultraviolet rays to form the primary resin layer 14, and then the resin composition for the secondary resin layer is applied to the periphery of the primary resin layer 14 and cured by irradiation with ultraviolet rays to form the secondary resin layer 15. In this case, the pH of the primary resin layer is set to be greater than the pH of the secondary resin layer when the resin composition for the secondary resin layer is cured. A method (wet-on-wet method) may be used in which the resin composition for the primary resin layer is applied to the outer periphery of the glass fiber 13, then the resin composition for the secondary resin layer is applied to the periphery thereof, and they are simultaneously cured by irradiation with ultraviolet rays to form the primary resin layer 14 and the secondary resin layer 15. In this case, the pH of the primary resin layer is set to be greater than the pH of the secondary resin layer when the resin composition for the primary resin layer and the resin composition for the secondary resin layer are cured. In either case, specifically, an acidic substance is not added to the resin composition for the primary resin layer and can be added to the resin composition for the secondary resin layer. In other words, the pH of the resin composition for the primary resin layer is greater than the pH of the resin composition for the secondary resin layer. The acidic substance is not added to the resin composition for the primary resin layer, and therefore the acidic substance causing an increase in the transmission loss of the optical fiber at low temperature can be prevented. Then, hydrogen ions derived from the acidic substance included in the secondary resin layer diffuse and migrate into the primary resin layer, and the pH of the primary resin layer decreases. Thus, the adhesion between the primary resin layer and the glass fiber becomes strong, and the dynamic fatigue coefficient of the optical fiber increases.

A colored layer that is an ink layer may be formed on the outer peripheral surface of the secondary resin layer 15 constituting the coating resin layer 16 in order to distinguish the optical fiber. The secondary resin layer 15 may be a colored layer. The colored layer preferably contains a pigment from the viewpoint of improving the distinguishability of the optical fiber. Examples of the pigment include coloring pigments such as carbon black, titanium oxide, and flowers of zinc, magnetic powders such as $\gamma\text{-Fe}_2\text{O}_3$, mixed crystals of $\gamma\text{-Fe}_2\text{O}_3$ and $\gamma\text{-Fe}_3\text{O}_4$, $\text{CrO}_2$, cobalt ferrite, cobalt-adhered iron oxide, barium ferrite, Fe—Co, and Fe—Co—Ni, and inorganic pigments such as MIO, zinc chromate, strontium chromate, aluminum tripolyphosphate, zinc, alumina, glass, and mica. Organic pigments such as azo pigments, phthalocyanine-based pigments, and dyeing lake pigments can also be used. The pigment may be subjected to treatment such as various surface modifications and composite pigment formation.

Optical Fiber Ribbon

An optical fiber ribbon can be fabricated using the optical fibers in this embodiment. In the optical fiber ribbon, a plurality of optical fibers arranged in a row are integrated by a ribbon material. The ribbon material is formed of, for example, an epoxy acrylate resin, a urethane acrylate resin, or the like.

EXAMPLES

The present invention will be described in more detail below by showing the results of evaluation tests using Examples according to the present invention and a Comparative Example. The present invention is not limited to these Examples.

Synthesis of Urethane Oligomers

Synthesis Example 1

A reaction was performed using polypropylene glycol (NOF CORPORATION, product name "UNIOL D-2000," number average molecular weight of 2000) as a polyol, 2,4-tolylene diisocyanate as a polyisocyanate, 2-hydroxyethyl acrylate as a hydroxyl group-containing (meth)acrylate compound, methanol as a monohydric alcohol, methoquinone as a polymerization inhibitor, and dibutyltin dilaurate as a catalyst, to synthesize an urethane oligomer. The content of the one-end non-reactive oligomer (oligomer having one end blocked with methanol) in the urethane oligomer was 20% by mass.

Synthesis Example 2

A urethane oligomer in which the content of a one-end non-reactive oligomer was 100% by mass was synthesized in the same manner as in Synthesis Example 1 except that the amounts of 2-hydroxyethyl acrylate and methanol blended were changed.

Synthesis Example 3

A urethane oligomer in which the content of a one-end non-reactive oligomer was 40% by mass was synthesized in the same manner as in Synthesis Example 1 except that the amounts of 2-hydroxyethyl acrylate and methanol blended were changed.

Preparation of Resin Compositions for Primary Resin Layers

Preparation Example A1

75 Parts by mass of the oligomer obtained in Synthesis Example 1, as a urethane oligomer, 12 parts by mass of nonylphenyl acrylate and 6 parts by mass of N-vinylcaprolactam as monofunctional monomers, 2 parts by mass of 1,6-hexanediol diacrylate as a polyfunctional monomer, 1 part by mass of 2,4,6-trimethylbenzoyldiphenylphosphine oxide (Irgacure TPO) as a photopolymerization initiator, and 1 part by mass of 3-mercaptopropyltrimethoxysilane (MPTS) as a silane coupling agent were mixed to obtain a resin composition A1.

Preparation Example A2

A resin composition A2 was obtained in the same manner as in Preparation Example A1 except that the silane coupling agent was changed to oligomer-added MPTS (a silane coupling agent in which the portion of the SH of mercaptopropyltrimethoxysilane and the NCO of a urethane oligomer were reacted (a silane compound in which the R of a reaction product (A) was the residue of mercaptopropyltrimethoxysilane)).

Preparation Example A3

A resin composition A3 was obtained in the same manner as in Preparation Example A1 except that the silane coupling agent was changed to oligomer-added MPTS and tetraethoxysilane (TEOS).

Preparation Example A4

A resin composition A4 was obtained in the same manner as in Preparation Example A1 except that the urethane oligomer was changed to the oligomer obtained in Synthesis Example 2.

Preparation Example A5

A resin composition A5 was obtained in the same manner as in Preparation Example A1 except that the urethane oligomer was changed to the oligomer obtained in Synthesis Example 3.

Preparation Example A6

A resin composition A6 was obtained in the same manner as in Preparation Example A1 except that 5 parts by mass of a triarylsulfonium salt represented by the above formula (S-2) (acid generating agent) was mixed.

Preparation of Resin Composition for Secondary Resin Layer

Preparation Example B1

75 Parts by mass of a urethane oligomer obtained by reacting polypropylene glycol having a number average molecular weight of 1000, 2,4-tolylene diisocyanate, and 2-hydroxyethyl acrylate, 10 parts by mass of the ethylene oxide adduct diacrylate of bisphenol A, 3 parts by mass of 1-hydroxycyclohexyl phenyl ketone (Irgacure 184), and 5 parts by mass of the above acid generating agent were mixed to obtain a resin composition B1.

Preparation Example B2

A resin composition B2 was obtained in the same manner as in Preparation Example B1 except that 5 parts by mass of the acid generating agent was changed to 3 parts by mass of pentaerythritol tetrakis(3-mercaptopropionate) (PETMP).

Preparation Example B3

A resin composition B3 was obtained in the same manner as in Preparation Example B1 except that the amount of the acid generating agent was changed from 5 parts by mass to 2.5 parts by mass.

Preparation Example B4

A resin composition B4 was obtained in the same manner as in Preparation Example B1 except that the amount of the acid generating agent was changed from 5 parts by mass to 0.25 parts by mass.

Preparation Example B5

A resin composition B5 was obtained in the same manner as in Preparation Example B1 except that the acid generating agent was not blended.

Fabrication of Optical Fiber 10

Example 1

A glass fiber 13 composed of a core 11 and a cladding 12 and having an outer diameter (D2) of 125 μm was provided. Then, a primary resin layer 14 was formed on the outer peripheral surface of the glass fiber 13 using the resin composition A1, and a secondary resin layer 15 was formed using the resin composition B1, to fabricate an optical fiber 10. The thickness of the primary resin layer 14 was 35 μm, and the thickness of the secondary resin layer 15 was 25 μm.

Example 2

An optical fiber was obtained by operating in the same manner as in Example 1 except that a primary resin layer was formed using the resin composition A2, and a secondary resin layer was formed using the resin composition B2.

Example 3

An optical fiber was obtained by operating in the same manner as in Example 1 except that a primary resin layer was formed using the resin composition A2, and a secondary resin layer was formed using the resin composition B3.

Example 4

An optical fiber was obtained by operating in the same manner as in Example 1 except that a primary resin layer was formed using the resin composition A3.

Example 5

An optical fiber was obtained by operating in the same manner as in Example 1 except that a primary resin layer was formed using the resin composition A4, and a secondary resin layer was formed using the resin composition B4.

Example 6

An optical fiber was obtained by operating in the same manner as in Example 1 except that a primary resin layer was formed using the resin composition A5.

Comparative Example 1

An optical fiber was obtained by operating in the same manner as in Example 1 except that a primary resin layer was formed using the resin composition A6, and a secondary resin layer was formed using the resin composition B5.

Evaluation

The resin compositions and the optical fibers were evaluated under the following conditions. The results are shown in Table 1.

pH Measurement

Each of the resin compositions for primary resin layers and the resin compositions for secondary resin layers was irradiated with ultraviolet rays at 100 mJ/cm$^2$ under a nitrogen atmosphere and cured to fabricate a film. Then, 2 g of the film was immersed in 30 g of an aqueous solution in which a 0.01 N sodium hydroxide aqueous solution or a 0.01 N HCl aqueous solution was added to pure water to adjust pH at 7.0, and extracted at 80° C. for 24 hours, and then the pH of the aqueous solution was measured by a pH meter.

Young's Modulus of Primary Resin Layer

The Young's modulus of the primary resin layer was measured by a Pullout Modulus (POM) method at 23° C. Two parts of the optical fiber 10 were fixed by two chuck apparatuses, the coating resin layer 16 (the primary resin layer 14 and the secondary resin layer 15) portion between the two chuck apparatuses was removed, then one chuck apparatus was fixed, and the other chuck apparatus was slowly moved in the direction opposite to the fixed chuck apparatus. The Young's modulus of the primary resin layer 14 was obtained from the following formula:

$$\text{Young's modulus (MPa)} = ((1+n)W/\pi LZ) \times \ln(Dp/Df)$$

wherein L represents the length of the portion of the optical fiber 10 pinched by the chuck apparatus to be moved, Z represents the amount of movement of the chuck, Dp represents the outer diameter of the primary resin layer 14, Df represents the outer diameter of the glass fiber 13, n represents the Poisson's ratio of the primary resin layer 14, and W represents the load during the movement of the chuck apparatus.

Low Temperature Characteristics

The transmission loss of the optical fiber 10 to which a screening tension of 2 kg was applied was measured at 23° C., then the optical fiber 10 was placed at −40° C. for 2 hours, and the transmission loss was measured. The increase in the transmission loss of light having a wavelength of 1550 nm for the optical fiber 10 after the placement at −40° C. compared with that for the optical fiber 10 before the placement at −40° C. was obtained. An increase in transmission loss of 0.03 dB/km or less was taken as "OK," and an increase in transmission loss of more than 0.03 dB/km was taken as "NG"

Measurement of Dynamic Fatigue Coefficient

An n value was measured according to the provisions of Telcordia GR-20-CORE using a tensile tester, and one in which the n value was 20 or more was taken as acceptable.

TABLE 1

| | | Example 1 | Example 2 | Example 3 | Example 4 | Example 5 | Example 6 | Comparative Example 1 |
|---|---|---|---|---|---|---|---|---|
| Primary resin layer | Resin composition | A1 | A2 | A2 | A3 | A4 | A5 | A6 |
| | Acidic substance (parts by mass) | — | — | — | — | — | — | Acid generating agent (5) |
| | pH | 6 | 6 | 6 | 6 | 6 | 6 | 4 |
| | Young's modulus (MPa) | 0.5 | 0.5 | 0.5 | 0.5 | 0.05 | 0.2 | 0.5 |

TABLE 1-continued

|  |  | Example 1 | Example 2 | Example 3 | Example 4 | Example 5 | Example 6 | Comparative Example 1 |
|---|---|---|---|---|---|---|---|---|
| Secondary resin layer | Resin composition | B1 | B2 | B3 | B1 | B4 | B1 | B5 |
|  | Acidic substance (parts by mass) | Acid generating agent (5) | PETMP (3) | Acid generating agent (2.5) | Acid generating agent (5) | Acid generating agent (0.25) | Acid generating agent (5) | — |
|  | pH | 4 | 3 | 4.5 | 4 | 5 | 4 | 6 |
| Low temperature characteristics |  | OK | OK | OK | OK | OK | OK | NG |
| Dynamic fatigue coefficient |  | 21 | 21 | 21 | 21 | 20 | 21 | 27 |

REFERENCE SIGNS LIST

10: optical fiber, 11: core, 12: cladding, 13: glass fiber, 14: primary resin layer, 15: secondary resin layer, 16: coating resin layer.

The invention claimed is:

1. An optical fiber comprising:
 a glass fiber;
 a primary resin layer coating an outer periphery of the glass fiber; and
 a secondary resin layer coating an outer periphery of the primary resin layer, wherein
 a pH of the primary resin layer is greater than a pH of the secondary resin layer.

2. The optical fiber according to claim 1, wherein a difference between the pH of the primary resin layer and the pH of the secondary resin layer is 1 to 3.

3. The optical fiber according to claim 1, wherein the pH of the secondary resin layer is 3 to 5.

4. The optical fiber according to claim 1, wherein the secondary resin layer comprises a cured product of a resin composition containing a urethane oligomer, a monomer, a photopolymerization initiator, and an acidic substance.

5. The optical fiber according to claim 1, wherein the primary resin layer comprises a cured product of a resin composition containing a urethane oligomer, a monomer, a photopolymerization initiator, and a silane coupling agent.

6. A method for manufacturing an optical fiber comprising a glass fiber, a primary resin layer coating an outer periphery of the glass fiber, and a secondary resin layer coating an outer periphery of the primary resin layer, the method comprising:
 a step of curing a resin composition for a primary resin layer by irradiation with ultraviolet rays to form the primary resin layer; and
 a step of curing a resin composition for a secondary resin layer by irradiation with ultraviolet rays to form the secondary resin layer, wherein
 when the resin composition for the primary resin layer and the resin composition for the secondary resin layer are cured, a pH of the primary resin layer is greater than a pH of the secondary resin layer.

7. The method according to claim 6, wherein a difference between the pH of the primary resin layer and the pH of the secondary resin layer is 1 to 3.

8. The method according to claim 6, wherein the pH of the secondary resin layer is 3 to 5.

9. The method according to claim 6, wherein the resin composition for the secondary resin layer contains a urethane oligomer, a monomer, a photopolymerization initiator, and an acidic substance.

10. The method according to claim 6, wherein the resin composition for the primary resin layer contains a urethane oligomer, a monomer, a photopolymerization initiator, and a silane coupling agent.

11. The optical fiber according to claim 2, wherein the pH of the secondary resin layer is 3 to 5.

12. The optical fiber according to claim 11, wherein the secondary resin layer comprises a cured product of a resin composition containing a urethane oligomer, a monomer, a photopolymerization initiator, and an acidic substance.

13. The optical fiber according to claim 12, wherein the primary resin layer comprises a cured product of a resin composition containing a urethane oligomer, a monomer, a photopolymerization initiator, and a silane coupling agent.

14. The method according to claim 7, wherein the pH of the secondary resin layer is 3 to 5.

15. The method according to claim 14, wherein the resin composition for the secondary resin layer contains a urethane oligomer, a monomer, a photopolymerization initiator, and an acidic substance.

16. The method according to claim 15, wherein the resin composition for the primary resin layer contains a urethane oligomer, a monomer, a photopolymerization initiator, and a silane coupling agent.

17. The optical fiber according to claim 12, wherein the resin composition contains 0.10 to 10% by mass of the acidic substance.

18. The optical fiber according to claim 13, wherein the monomer comprises a heterocycle-containing monomer.

19. The method according to claim 15, wherein the resin composition contains 0.10 to 10% by mass of the acidic substance.

20. The method according to claim 16, wherein the monomer comprises a heterocycle-containing monomer.

* * * * *